Oct. 21, 1969  D. G. PENSEL  3,473,332
HEAT MISER ENGINE
Filed Jan. 16, 1968
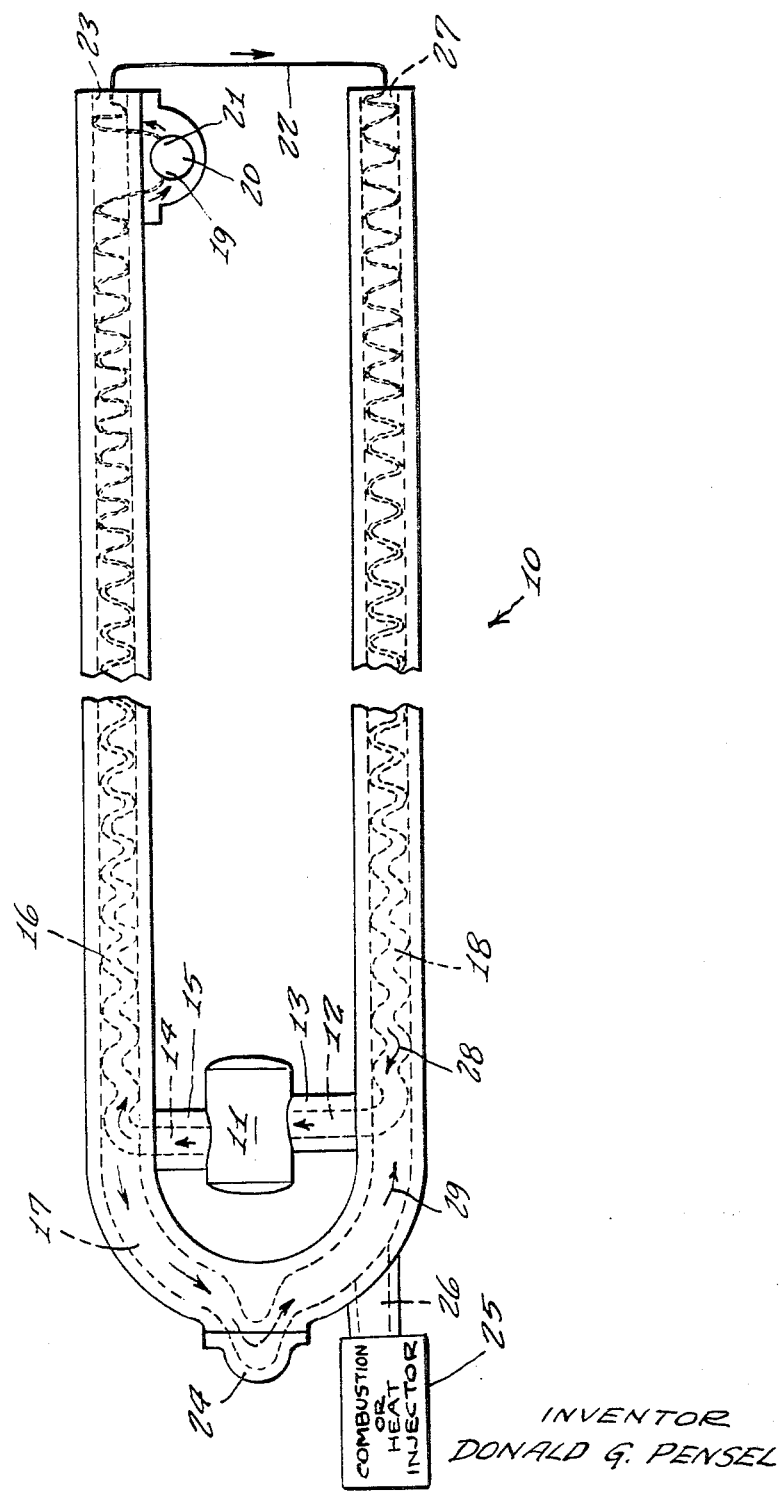
INVENTOR
DONALD G. PENSEL United States Patent Office 3,473,332
Patented Oct. 21, 1969

3,473,332
HEAT MISER ENGINE
Donald G. Pensel, R.D. 1, Lake George, N.Y. 12845
Filed Jan. 16, 1968, Ser. No. 698,335
Int. Cl. F01k *19/10*
U.S. Cl. 60—96                                    3 Claims

ABSTRACT OF THE DISCLOSURE

A closed cycle vapor generating device including a vapor driven engine. An insulated conduit through which air passes to condense vapor in one section of a passageway extending from the engine, and the air then passing to a combustion section of the conduit wherein vapor for the engine is generated in another section of the passageway. The passageway in the condensing section and in the vapor generating section being of decreasing cross-sectional area.

---

This invention relates generally to engines.

It is generally well known to those skilled in the art that most of the energy lost in the operation of various engines escapes in the form of heat. Should most of the heat be conserved and utilized or transferred within the working mechanism of the engine, the result might be utilized or converted to mechanical output.

Accordingly it is a principal object of the present invention to provide a heat miser engine which is designed so as to conserve heat generated by the engine and converting it to mechanical output.

Another object of the present invention is to provide a heat miser engine which includes a vapor driven engine, a combustion or heat injector and an insulated duct for air driven by one or more air blowers.

Other objects of the present invention are to provide a heat miser engine which is simple in design, inexpensive to manufacture, rugged in construction, easy to use and efficient in operation.

These and other objects will become readily apparent upon a study of the following specification together with the accompanying drawing wherein:

The sole figure is a diagrammatical representation of the present invention.

Referring now to the drawing in detail, the reference numeral 10 represents a heat miser engine, according to the present invention, wherein there is a vapor driven engine 11.

The engine is connected on one side to an inlet pipe 12 enclosed within insulation 13. Upon its opposite side the engine is connected to an outlet pipe 14 enclosed within insulation 15.

The outlet pipe is connected to a coil 16 enclosed within one side of a U-shaped duct 17, while the inlet pipe 13 is connected to a coil 18 located within an opposite side of the U-shaped duct 16. As is readily evident in the drawing, it is to be noted that each of the pipes 12 and 14 communicate with a relatively larger diameter portion of the respective coils and that each of the coils 16 and 18 become gradually smaller in diameter toward their opposite ends. It is to be noted that this reference to diameter sizes refers to the diameter of the pipe which forms the coil and does not refer to the circular turns thereof.

At its opposite end, the coil 16 communicates with the inlet side 19 of a pump 20 which is of high-pressure type. An outlet side 21 of the high-pressure pump communicates with a pipe 22 which at its opposite end is connected to the relatively small diameter pipe portion of coil 18.

The U-shaped duct 17 includes an inlet 23 at one end for receiving air. A blower 24 at the opposite, intermediate portion of the duct is provided for intercepting the air passing through the duct and driving the same onward. A combustion or heat injector 25 communicates with duct 17 by means of a duct 26. The combustion or heat injector is located between the blower 24 and the position where the coil 18 is connected to pipe 12. The air from the blower is accordingly influenced by the combustion or heat injector as it travels toward the coil 18. The air then leaving the duct by means of a duct outlet located at 27.

As is shown in the diagram, it is to be noted that volatile liquid travels in an opposite direction to the air movement through the duct as is indicated by the arrows 28 defining movement of the volatile liquid whereas arrows 29 define movement of the air.

It is to be noted that one or more air blowers may be used for forcing the air through the insulated ducting. Fuel is injected into the ducting in the position just prior to a location where coiled piping transfers the volatile liquid in reverse direction and out of the ducting into the displacement engine or vapor driven engine. A spark plug or other means ignite the fuel. Flame and heat is forced through the ducting and around the coiled piping. It can be noted that the piping gradually changes sizes according to the temperature of the volatile liquid at a given position therewithin. The hotter the liquid, the more volume is required.

The volatile liquid is pumped through the piping which takes it through more and more intense heat, finally boiling the liquid, increasing the speed and volume of substance destined to pass through the engine. The substance is then dispelled from the engine into the large outlet which then enters the intake side of the air ducting which provides better and better cooling as it travels through the intake duct closer and closer toward the virgin air. The heat which escaped unused through the engine, is thus returned to be used again in the portion of the unit where the power is generated for the engine. The exhaust is also cooled by the liquid bringing heat back toward the engine. If this should not provide satisfactory cooling of the exhaust, a special heat exchanger could be installed using this heat to heat the air intake somewhere along the length thereof. The engine cooling system should also use the intake air for heat discharge. The main features of the design are clearly indicated in the present drawing.

I claim:

1. In a heat miser engine, the combination of a vapor driven engine, a combustion or heat injector, a pipe circuit communicating with said vapor driven engine, said pipe circuit being contained within a duct and comprses an outlet pipe adjacent one side of said vapor driven engine, said outlet pipe being connected to one end of a first coil, the opposite end of said first coil being connected to one side of a high pressure pump, the opposite side of said high pressure pump being connected to a pipe connected at its other end to one side of a second coil, the opposite side of said second coil being connected to an intake pipe of said vapor driven engine, each of said pipes comprising said coils is of relatively large diameter adjacent said pipes communicating with said vapor driven engine, said pipes forming said coil become gradually smaller in diameter toward their opposite ends.

2. The combination as set forth in claim 1 wherein an air blower communicates with said duct at a location between said coils.

3. The combination as set forth in claim 2 wherein said combustion or heat injector communicates with said duct, adjacent said blower, said duct providing means for circulating air through said duct in one direction while said pipe circuit provides means for circulating volatile liquid in a reverse direction thereto.

References Cited

UNITED STATES PATENTS 1,425,629   8/1922   Bell _____ 60—96
2,079,923   5/1937   Pavlecka _____ 60—108

CARROLL B. DORITY, JR., Primary Examiner